(12) United States Patent
Hershbarger

(10) Patent No.: US 10,611,406 B2
(45) Date of Patent: Apr. 7, 2020

(54) ROTARY POSITION SENSOR ISOLATOR

(71) Applicant: Deere and Company, Moline, IL (US)

(72) Inventor: James M. Hershbarger, LeClaire, IA (US)

(73) Assignee: Deere & Company, Moline, IL (US)

(*) Notice: Subject to any disclaimer, the term of this patent is extended or adjusted under 35 U.S.C. 154(b) by 12 days.

(21) Appl. No.: 15/994,960

(22) Filed: May 31, 2018

(65) Prior Publication Data

US 2019/0367091 A1 Dec. 5, 2019

(51) Int. Cl.
*B62D 15/02* (2006.01)
*A01D 41/14* (2006.01)
*A01D 75/26* (2006.01)

(52) U.S. Cl.
CPC ............ *B62D 15/02* (2013.01); *A01D 41/141* (2013.01); *A01D 75/26* (2013.01); *B60Y 2200/222* (2013.01)

(58) Field of Classification Search
CPC ....... B62D 15/02; A01D 41/141; A01D 75/26
USPC .......................................................... 701/41
See application file for complete search history.

(56) References Cited

U.S. PATENT DOCUMENTS

| | | | | |
|---|---|---|---|---|
| 6,107,767 A | * | 8/2000 | Lu .......................... | B62D 5/046 318/432 |
| 7,404,342 B2 | * | 7/2008 | Wurn ........................ | G05G 1/38 74/512 |
| 7,614,372 B2 | * | 11/2009 | Lichti .................... | F01L 1/3442 123/90.15 |
| 2012/0261209 A1 | * | 10/2012 | Shiino ...................... | B62D 6/10 180/446 |
| 2015/0224845 A1 | * | 8/2015 | Anderson ............ | B60G 17/019 701/37 |

FOREIGN PATENT DOCUMENTS

| EP | 0985910 A1 | 3/2000 |
|---|---|---|
| EP | 1726512 A1 | 11/2006 |

OTHER PUBLICATIONS

Content of European Search Report issued in counterpart European Patent Application No. 19176807.6 dated Nov. 7, 2019 (5 pages).

* cited by examiner

*Primary Examiner* — Yazan A Soofi
(74) *Attorney, Agent, or Firm* — Rathe Lindenbaum LLP

(57) ABSTRACT

A rotary position sensor senses rotation of a first member, having a first torque coupling surface, about an axis relative to a second member by sensing movement of a torque receiving component of the rotary. The isolator may include a mount, a linkage and a torsion spring. The linkage is to be coupled to the torque receiving component of the rotary sensor. The linkage has a second torque coupling surface separable from the first torque coupling surface by a play gap, wherein during rotation of the first member, the first torque coupling surface is to contact the second torque coupling surface to transmit torque to the linkage. The torsion spring is captured between the mount and the linkage independent of the torque receiving component to resiliently bias the second torque coupling surface through the play gap and into engagement with the first torque coupling surface.

20 Claims, 9 Drawing Sheets

ROTARY POSITION SENSOR ISOLATOR

BACKGROUND

Rotary position sensors may be used in a variety of applications to sense rotational movement or angular positioning of one member relative to another member. For example, rotary position sensors are sometimes employed in combine harvesters to detect steering positions of the combine harvester. Such rotary position sensors may be subject to wear and damage during use.

Figure 1:
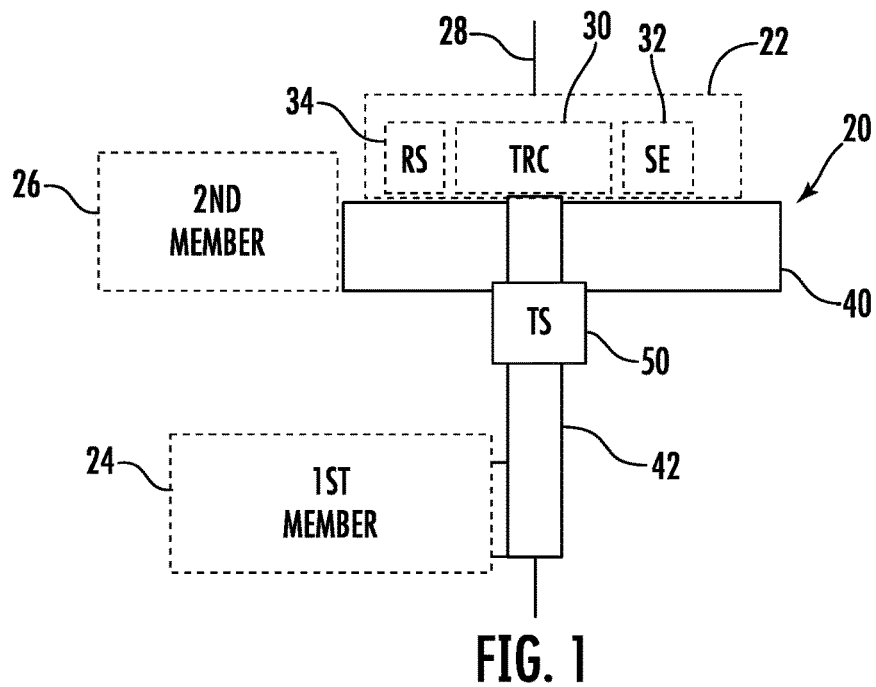
FIG. 1 is a sectional view schematically illustrating portions of an example isolator for rotary position sensor.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example rotary position sensors, isolators and rotary positioning systems that employ such isolators to potentially reduce wear and damage to rotary position sensors during their use. Disclosed herein is an example rotary position sensing method that detects the relative angular positioning or rotation of two members while also reducing wear and damage to the rotary position sensor being utilized. The disclosed isolators, positioning systems and methods reduce wear or potential damage to the rotary position sensor by isolating the rotary position sensor from vibration and other movement.

Disclosed is a coaxial rotary positioning that has a linkage that rotates in response to rotation of a first member. The linkage transmits torque to a torque receiving component of a rotary sensor, wherein the rotary sensor senses movement of the torque receiving component to detect movement of the first member. To accommodate vibration and/or to accommodate manufacturing tolerances, the linkage is not fixed to the first member, but has a torque coupling surface that bears against a torque coupling surface of the first member, wherein the two torque coupling surfaces are separable by a tolerance gap or play gap, a distance by which the two torque coupling surfaces may be separate or move away from one another.

This play gap introduces hysteresis in that rotation of the first member may not be initially detected if the torque coupling surface of the first member must be moved through any remainder of the play gap prior to engaging the torque coupling surface of the linkage. In prior coaxial rotary position sensing systems, such hysteresis was removed by utilizing an internal return spring of the rotor position sensor itself to bias the torque receiving component of the sensor against the linkage to bias the torque coupling surface of the linkage through any remaining play gap against the torque coupling surface of the first member. Unfortunately, such use of the return spring of the rotary position sensor may lead to wear and damage of the return spring.

The disclosed coaxial rotary positioning systems reduce or eliminate reliance upon such a return spring of the rotary position sensor by utilizing a separate torsion spring that resiliently biases the torque coupling surface of the linkage against the torque coupling surface of the first member independent of the torque receiving component of the rotary position sensor. In the disclosed systems, the return spring merely biases the torque receiving component against a torque transmitting surface of the linkage. In some implementations, the return spring may be omitted in the rotary position sensor. With the disclosed isolator and the disclosed methods, vibration or other movement is not absorbed or taken up by the return spring, but is instead taken up by the isolator torsion spring, reducing potential wear and damage to the rotary position sensor.

Disclosed herein is an example isolator for a rotary sensor that senses rotation of a first member about an axis relative to a second member by sensing movement of a torque receiving component of the rotary sensor. The member having a first torque coupling surface. The isolator may include a mount fixed against rotation about the axis, a linkage in a torsion spring. The linkage is to be coupled to the torque receiving component of the rotary sensor. The linkage has a second torque coupling surface separable from the first torque coupling surface by a play gap, wherein during rotation of the first member about the axis, the first torque coupling surface is to contact the second torque coupling surface to transmit torque to the linkage. The torsion spring is connected to the linkage independent of the torque receiving component and is captured between the mount and the linkage to resiliently bias the second torque coupling surface about the axis through the play gap and into torque transmitting engagement with the first torque coupling surface.

Disclosed herein is an example rotary positioning system. The rotary positioning system may include a first member, a second member, a rotary position sensor and an isolator. The first member is rotatable relative to the second member about an axis in response to torque transmitted across a first torque coupling surface of the first member. The rotary position sensor may include a torque receiving component and at least one sensing element to sense movement of the torque receiving component. The isolator may include a mount fixed against rotation about the axis, a linkage in a torsion spring. The linkage is coupled to the torque receiving component of the rotary sensor. The linkage has a second torque coupling surface separable from the first torque coupling surface by a play gap, wherein during rotation of the first member about the axis, the first torque coupling surface is to contact the second torque coupling surface to transmit torque to the linkage. The torsion spring is captured between the mount and the linkage independent of the torque receiving component to resiliently bias the second torque coupling surface about the axis through the play gap and into torque transmitting engagement with the first torque coupling surface.

Disclosed is an example rotary position sensing method. The example method may include rotating a first member relative to a second member and transmitting torque from the rotating first member to a linkage through interaction of a first torque coupling surface of the first rotating member to a second torque coupling surface of the linkage. The first torque coupling surface and the second torque coupling surface are separable by a play gap. The method may further include transmitting torque of the linkage to a torque receiving component of a rotary sensor and sensing movement of the torque receiving component to indicate rotation of the first member relative to the second member. The second torque coupling surface of the linkage is resiliently biased about the axis against the first torque coupling surface with a torsion spring independent of the torque receiving component of the rotary sensor.

FIG. 1 schematically illustrates portions of an example isolator 20 for reducing wear and damage to a rotary position sensor. As shown by broken lines in 1, isolator 20 is for use with a rotary position sensor 22 that senses rotation of a first member 24 relative to a second member 26 about an axis 28. Rotary position sensor 22 includes a torque receiving component (TRC) 30 that receives torque in response to rotation of the first member 24 relative to the second member 26. Rotary position sensor 22 further comprises a sensing element 32 (SE), such as a potentiometer, that senses such movement of the torque receiving component. In one implementation, the torque receiving component 30 is an internal component house by sensor 22, wherein torque receiving component 30 rotates and wherein the sensing element 32 senses such rotation. The sensed rotation of torque receiving component 30 indicates rotation of the first member relative to the second member and/or the angular positioning of the first member relative to the second member.

As further shown by broken lines, in some implementations, isolator 20 may be utilized with a rotary position sensor 22 that further includes a return spring 34. Return spring 34 resiliently biases component 32 a default position or state. In one implementation, return spring 34 applies torque to torque receiving component 32 rotate torque receiving component to a default position or state. In one implementation, return spring 34 resiliently biases torque receiving component 30 into abutment with an interacting link of isolator 20. As will be described hereafter, rather than relying upon return spring 34 to remove hysteresis, to rotate the linkage into contact with first member 24, subjecting return spring 34 two forces that may cause wear or damage, isolator 20 provides a separate torsion spring for removing hysteresis. In some implementations, the provision of the separate torsion spring may facilitate the omission of return spring 34 from rotary position sensor 22.

Isolator 20 comprises mount 40, linkage 42 and torsion spring 50. Mount 40 comprises at least one structure fixed against rotation about axis 28. In one implementation, mount 40 is separate and distinct from rotary position sensor 22. In one implementation, mount 40 is part of second member 26 or is fixed to second member 26 through the use of fasteners, welds or other securement mechanisms.

Linkage 42 comprises a single member or a group of members that are joined to one another so as to rotate in unison with one another about axis 28. Linkage 42 is configured to be coupled to torque receiving component 30 of rotary position sensor 22 to transmit torque to rotary position sensor 22 in response to rotation of linkage 42. For purposes of this disclosure, the phrase "configured to" denotes an actual state of configuration that fundamentally ties the stated function/use to the physical characteristics of the feature proceeding the phrase "configured to". For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Figure 2:
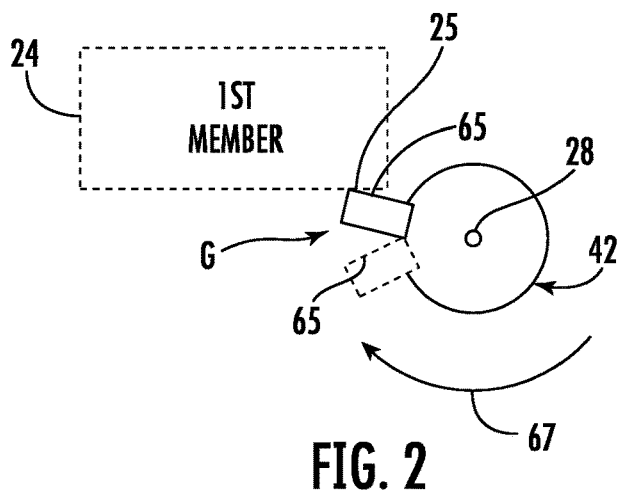
FIG. 2 is an end view of portions of the isolator of FIG. 1 with respect to a first member in a first angular position.

As shown by FIG. 2, first member 24 comprises a first torque coupling surface 25. Linkage 42 comprises a corresponding second torque coupling surface 65. As shown by FIG. 2, the second torque coupling surface 65 is movable relative to the first torque coupling surface 25 so as to move between a first position (shown in broken lines) in which surface 65 is separated from and spaced from surface 25 and a second position (shown in solid lines) in which surface 65 is abutting or contacting surface 25. In the position shown in broken lines in FIG. 2, surface 65 is separable from surface 25 by a play distance or play gap G. unless consumed, this play gap G may introduce hysteresis in the sensing of the rotational or angular positioning of first member 24 by the rotary position sensor 22 which relies upon the rotation of linkage 42.

Torsion spring 50 removes the hysteresis that may otherwise result from the gap G to provide more precise and reliable angular positioning or rotation sensing of first member 24. Torsion spring 50 operates independent of rotary position sensor 22, independent of torque receiving component 30. This means that torsion spring 50 resiliently biases the second torque coupling surface 65 into contact with the first torque coupling surface 25 without relying upon any forces transmitted through torque receiving component 32 bias surface 65 against surface 25. In the example illustrated, torsion spring 50 is captured between mount 40 and linkage 42, independent of torque receiving component 30 (neither torque receiving component 30 nor any other component of rotary position sensor 22 is physically positioned directly between torsion spring 50 and linkage 42), to resiliently biased the second torque coupling surface 65 about axis 28 through the play gap 30 (in the direction indicated by arrow 67) into torque transmitting engagement with the first torque coupling surface 25.

Because torsion spring 50 resiliently biases surface 65 into torque transmitting contactor engagements surface 25, initial rotation of first member 24 relative to second member 26 may result in immediate rotation of linkage 42. In other words, there is no delay between the time at which first member 24 begins to rotate about axis 28 and the time at which linkage 42 is correspondingly rotated. There is no hysteresis. At the same time, the removal of the hysteresis by torsion spring 50 is independent of torque receiving component 30 and rotary position sensor 22 so as to reduce wear and potential damage to rotary position sensor 22. This results in a more robust rotary position sensing system that provides reliable and accurate sensing with respect to the angular positioning of first member 24 and/or its rotation.

Figure 3:
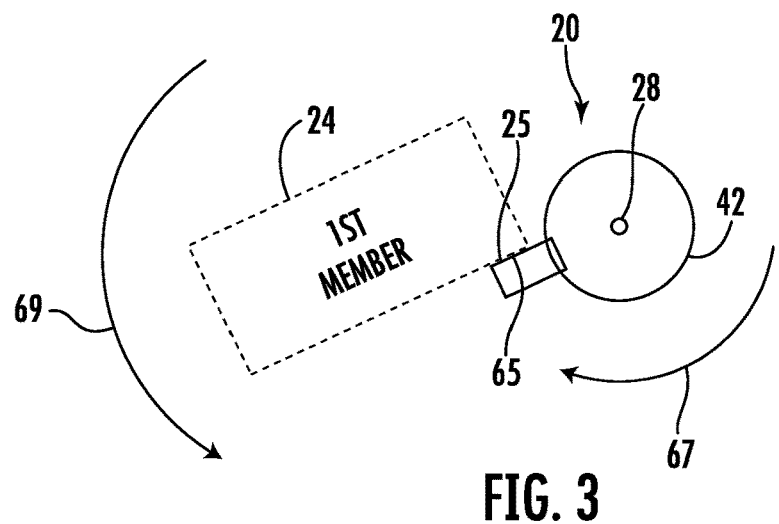
FIG. 3 is an end view of the portions of the isolator of FIG. 1 with respect to the first member in a second angular position.
Figure 4:
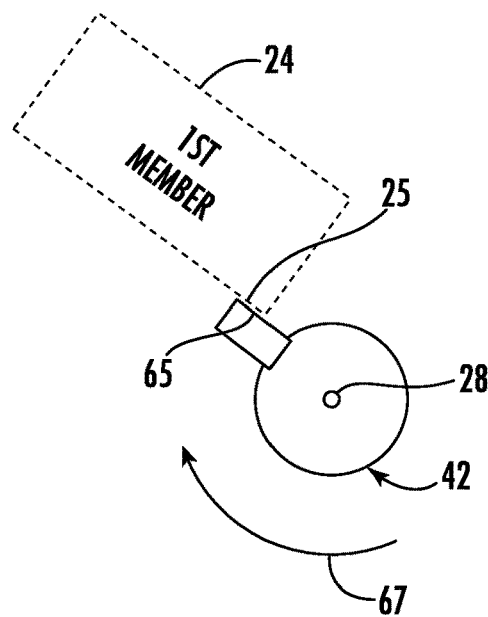
FIG. 4 is an end view of the portions of the isolator of FIG. 1 with respect to the first member in a third angular position.

FIGS. 3 and 4 schematically illustrate portions of isolator 20 during examples of rotation of first member 24 about axis 28. FIG. 3 illustrates first member 24 being rotated in a counterclockwise direction about axis 28 as indicated by arrow 69. During such time, torsion spring 50 continues to resiliently bias surface 65 of linkage 42 against surface 25. FIG. 4 illustrates first member 24 being rotated in a clockwise direction about axis 28 as indicated by arrow 71. During such time, torsion spring 50 continues to resiliently bias surface 65 of linkage 42 against surface 25.

Figure 5:
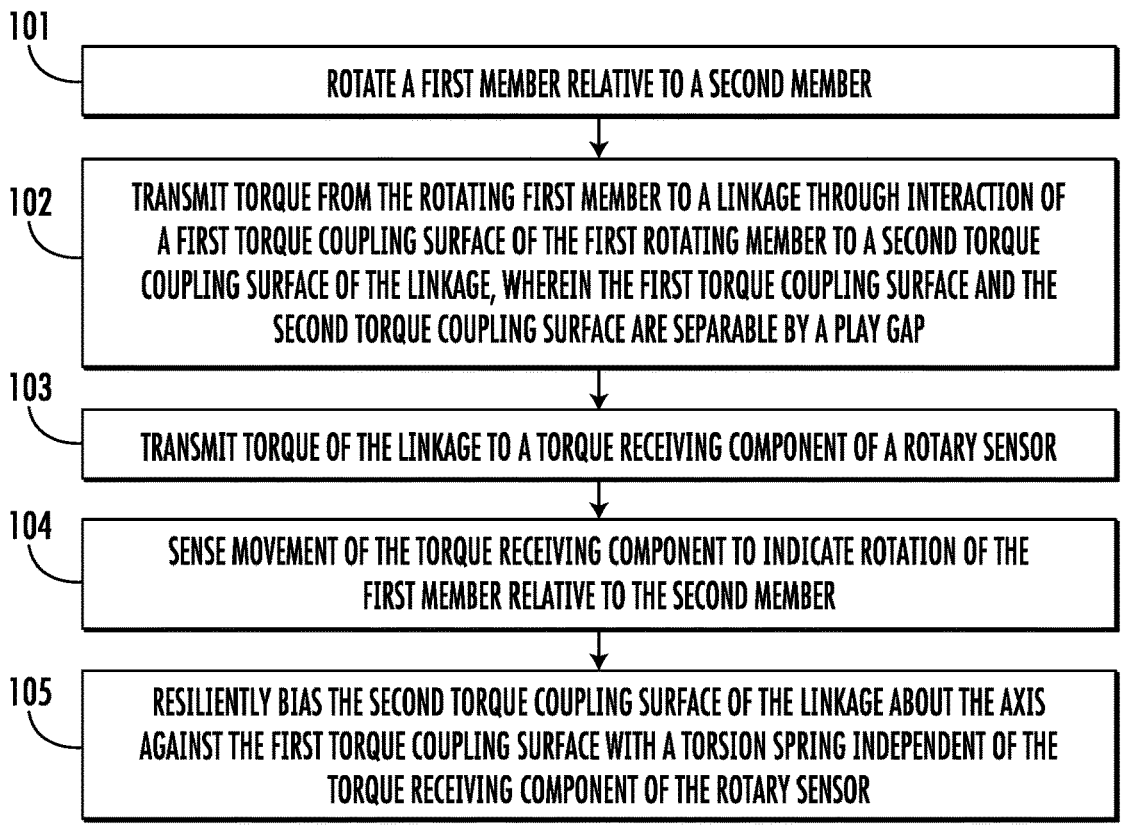
FIG. 5 is a flow diagram of an example rotary position sensing method.

FIG. 5 is a flow diagram of an example rotary position sensing method 100. Method 100 facilitates the sensing of an angular position of a first member relative to a second member or the rotation of the first member relative to the second member using a coaxial rotary position sensing system including isolator 20 described above. Method 100 provides for robust sensing with reduced whereupon the rotary position sensor. Although method 100 is described in the context of using isolator 20, method 100 may likewise be utilized with any of the following disclosed isolators or similar isolators.

As indicated by block 101, a first member, such as member 24, is rotated relative to a second member, such as member 26. As indicated by block 108, torque from the rotation of the first rotating member is transmitted to a linkage through interaction of a first torque coupling surface of the first rotating member with a second torque coupling surface of the linkage. The first coupling surface and the second torque coupling surface are separable by a play gap.

As indicated by block 102, torque from the rotation the linkage is transmitted to a torque receiving component of a rotary sensor. As indicated by block 103, the torque transmitted to the torque receiving component results in movement of the torque receiving component. As indicated by block 104, such movement of the torque receiving component is sensed to indicate rotation of the first member relative to the second member. Such rotation may indicate a speed or amount of rotation and/or an angular position of the first member relative to the second member As indicated by block 105, the torque coupling surface of the linkage is resiliently biased about the axis against the torque coupling surface of the first member with a torsion spring independent of the torque receiving component of the rotary sensor. As a result, hysteresis from the sensing system is removed while, the same time, not relying upon the spring 34 other components of the rotary position sensor 22 to eliminate the hysteresis.

Figure 6:
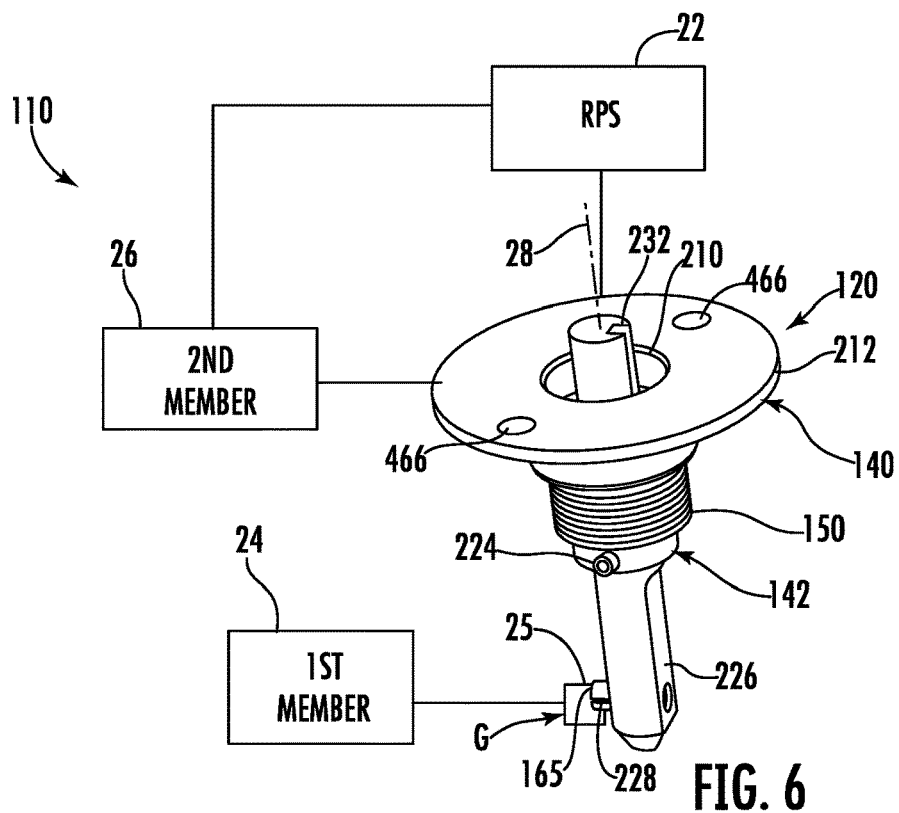
FIG. 6 is a perspective view of an example rotary positioning system with an example isolator.
Figure 7:
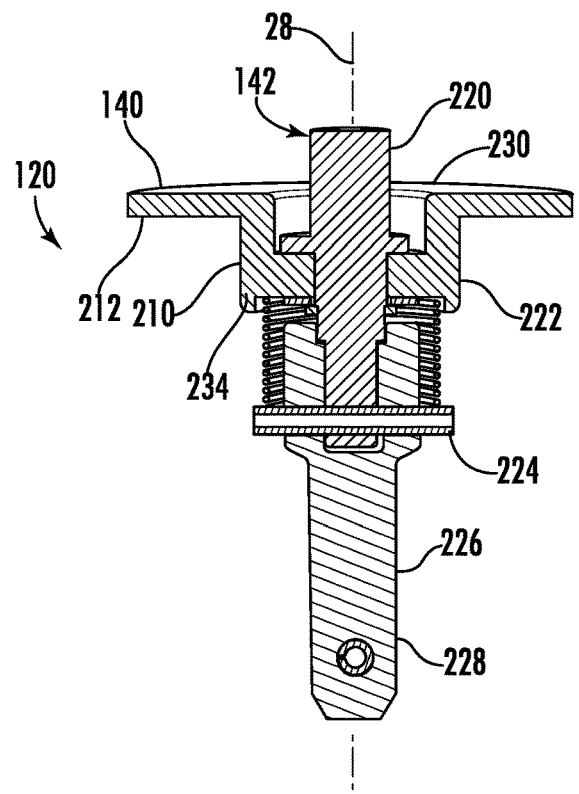
FIG. 7 is a sectional view of the example isolator of FIG. 6.

FIGS. 6-9 illustrate rotary position sensor isolator 120, an example of rotary position sensor isolator 20 described above. FIG. 6 illustrates rotary position sensor isolator 120 employed as part of a rotary positioning system 110 which additionally comprises rotary position sensor 22, first member 24 and second member 26 as described above. Rotary position sensor isolator 120 comprises mount 140, linkage 142 and torsion spring 150.

Mount 140 comprises at least one structure fixed against rotation about axis 28. In one implementation, mount 40 is separate and distinct from rotary position sensor 22 (schematically illustrated). In one implementation, mount 40 is part of second member 26 or is fixed to second member 26 through the use of fasteners, welds or other securement mechanisms.

Figure 8:
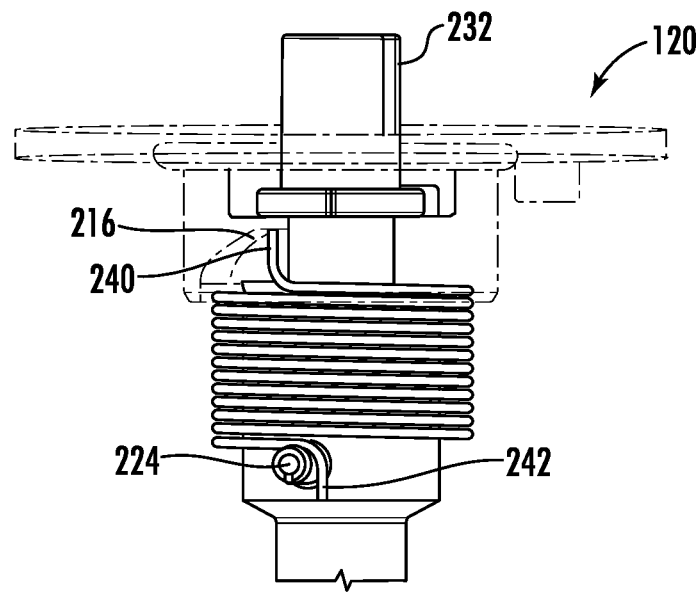
FIG. 8 is a side view of the example isolator of FIG. 6 with portions transparently shown.

In the example illustrated, mount 140 has an inverted top-hat shape, comprising a central cup portion 210, a circumferential rim 212, a stop tab 214 and spring catch 216 (shown in FIG. 8). Cup portion 210 has an interior which receives linkage 142. Cup portion 210 has a floor upon which a portion of linkage 142 rests or is supported. Circumferential rim 212 radially projects from cup portion 210 and provides a platform for mounting or securing mount 140 two second member 26 through the use of fasteners or the like. Circumferential rim 212 further provides an upper surface area for supporting rotary position sensor 22. Although illustrated as a continuous annular ring, circumferential rim 212 may alternatively comprise other structures to facilitate mounting of mount 140 against rotation about axis 28. For example, rim 212 may alternatively angularly spaced flats or tabs extending from cup portion 210.

Stop tab 214 comprises a structure projecting into the interior of cup portion 210. Stop tab 214 provides a stop surface 2154 bearing against a corresponding surface of linkage 142. Spring catch 216 comprises a notch, recess or surface for bearing against an end of torsion spring 150. As will be described hereafter, spring catch 216 and stop tab 214 facilitate pre-winding or preloading of torsion spring 150.

Linkage 142 comprises a single member or a group of members that are joined to one another so as to rotate in unison with one another about axis 28. Linkage 42 is configured to be coupled to torque receiving component 30 (shown in FIG. 1) of rotary position sensor 22 to transmit torque to rotary position sensor 22 in response to rotation of linkage 142.

In the example illustrated, linkage 142 comprises upper portion 220, snap ring 222, pin 224, lower portion 226 and pin 228. Upper portion 220 extends through the floor of cup portion 210 of mount 140 and beyond the interior of cup portion 210 for coupling engagement with the torque receiving component 30 (shown in FIG. 1) of rotary position sensor 22. Upper portion 220 comprises rim 230, keyway 232 and stop tab 234. Rim 230 rests upon the interior floor of cup portion 210, serving as a bearing surface during rotation of linkage 142 within cup portion 210. Keyway 232 comprise a channel for receiving a corresponding key associated with torque receiving component 30 of rotary position sensor 22 so as to couple linkage 142 to the torque receiving component 30 for the transmission of torque about axis 28. In other implementations, such coupling may be provided by other mechanical interlocking arrangements. Stop tab 232 projects outwardly from rim 230 and provide a stop surface 2364 abutting the stop surface 215 of stop tab 214 to facilitate preloading of torsion spring 150.

Snap ring 222 engages upper portion 220 below mount 140 so as to sandwich and capture the floor of cup portion 210 between rim 230 and snap ring 222. Snap ring 222 assists in axially retaining linkage 142. In other implementations, snap ring 222 may be omitted or may be replaced with other axial securing arrangements.

Pin 224 passes through upper portion 220 and lower portion 226 to connect and retain portions 224 and 226 relative to one another. In the example illustrated, pin 224 further serves as a catch or catching an end of torsion spring 150 when toward a spring 150 is pre-wound are preloaded. In the example illustrated, pin 224 comprises a slotted spring pin. In other implementations, pin 224 may comprise other types of pins.

Lower portion 226 comprises an upper bore receiving a portion of upper portion 220. Lower portion 226 supports pin 228. Lower portion 226 and upper portion 220 provide a two-piece shaft that facilitates manufacturer and assembly at a lower cost. Although of a portion 220 and lower portion 226 are illustrated as two separate components joined by pin 224, in other implementations, portions 220 and 224 may be replaced with a single integral shaft or member, wherein pin 224 may be replaced with a bump or other catch extending from the single integral shaft for retaining an end of torsion spring 150.

Pin 228 projects from lower portion 226. Pin 228 provides a second torque coupling surface 165 for interacting with the first torque coupling surface 25 of first member 24. In the example illustrated, pin 228 comprises a slotted spring pin. In other implementations, pin 228, may comprise other types of pins. in yet other implementations, the second torque coupling surface 165 may be provided by other structures mounted to lower portion 226. In still other implementations, the second torque coupling surface 165 may be provided by the shoulder, projection or other structure integrally formed as a single unitary body with lower portion 226 that is abutted surface 25 in response to rotation of first member 24 so as to transmit torque or the motion of the rotating first member 24 to linkage 142.

As with torsion spring 50, torsion spring 150 removes the hysteresis that may otherwise result from the gap G to provide more precise and reliable angular positioning or rotation sensing of first member 24. Torsion spring 150 operates independent of rotary position sensor 22, independent of torque receiving component 30. This means that torsion spring 150 resiliently biases the second torque coupling surface 65 into contact with the first torque coupling surface 25 without relying upon any forces transmitted through torque receiving component 30 to bias surface 165 against surface 25. In the example illustrated, torsion spring 150 is captured between mount 140 and linkage 142, independent of torque receiving component 30 (neither torque receiving component 30 nor any other component of rotary position sensor 22 is physically positioned directly between torsion spring 150 and linkage 142), to resiliently bias the second torque coupling surface 165 about axis 28 through the play gap 30 into torque transmitting engagement/contact (schematically shown in FIG. 6) with the first torque coupling surface 25.

Figure 9:
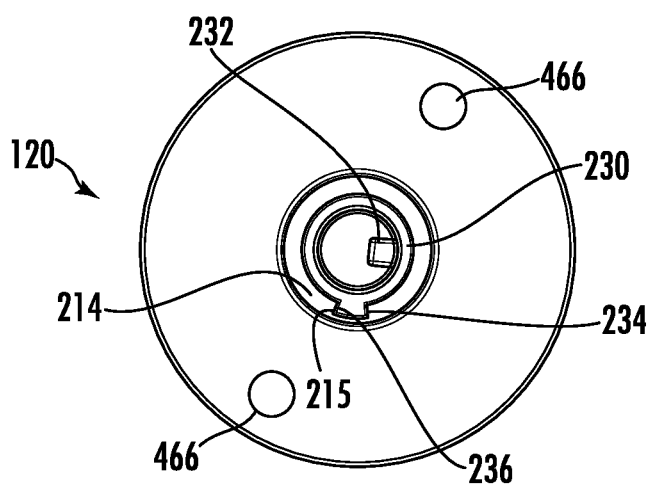
FIG. 9 is a top view of the example isolator of FIG. 6.

In the example illustrated, torsion spring 150 is configured such that it may be pre-wound or preloaded prior to connection to either of rotary position sensor 22 or first member 24. As shown by FIG. 8, torsion spring 150 has a first end 240 retained by catch 216. In the example illustrated, end 240 is received within a pocket extending into mount 140. Spring 150 has a second and 242 wrapped about and retained by pin 224. This exerts a torque upon linkage 142. As shown by FIG. 9, surface 236 of tab 234 of linkage 142 bears against surface 215 a stop tab 214 of mount 140, limiting rotation of linkage 142, facilitating the pre-winding or preloading of torsion spring 150 so as to bias linkage 142 in one direction for installation. In the example illustrated, the preloading according spring 150 is such that spring 150 has a sufficient torsion to overcome friction within isolator 120.

As with torsion spring 50, because torsion spring 150 resiliently biases surface 165 into torque transmitting contactor engagements surface 25, initial rotation of first member 24 relative to second member 26 may result in immediate rotation of linkage 142. In other words, there is no delay between the time at which first member 24 begins to rotate about axis 28 and the time at which linkage 142 is correspondingly rotated. There is no hysteresis. At the same time, the removal of the hysteresis by torsion spring 150 is independent of torque receiving component 30 and rotary position sensor 22 so as to reduce wear and potential damage to rotary position sensor 22. This results in a more robust rotary position sensing system that provides reliable and accurate sensing with respect to the angular positioning of first member 24 and/or its rotation.

Figure 10:
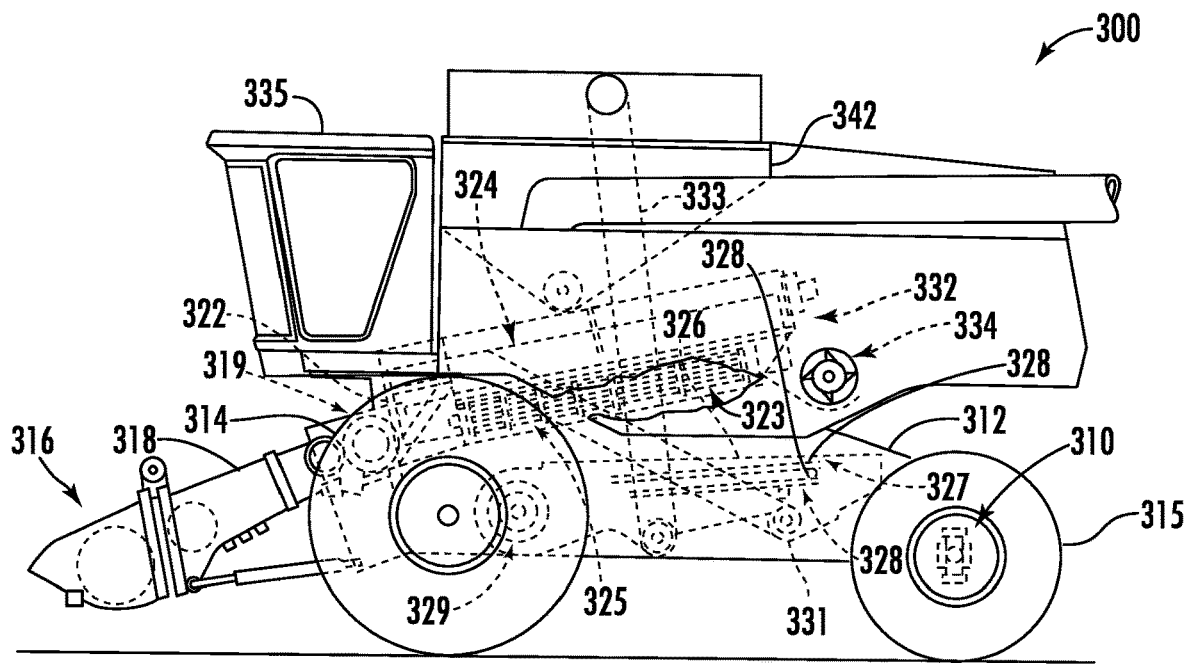
FIG. 10 is a side view of an example combine harvester comprising an example rotary positioning system.

FIG. 10 illustrates an example combine harvester 300 incorporating an example rotary positioning system 310 including isolator 120. Although isolator 120 is illustrated as being utilized with combine harvester 300, isolator 120 may likewise utilize in other systems wear the rotation or positioning of one member relative to another member is to be detected are sensed. In addition to rotary positioning system 310, combine harvester 300 comprises a main frame 312 having wheel structure including front and rear ground engaging wheels 314 and 315 supporting the main frame for forward movement over a field of crop to be harvested. The front wheels 314 are driven by an electronically controlled hydrostatic transmission.

As further shown by FIG. 10, harvester 300 further comprises a vertically adjustable header or harvesting platform 316 is used for harvesting a crop and directing it to a feeder house 318. The feeder house 318 is pivotally connected to the frame 312 and includes a conveyor for conveying the harvested crop to a beater 319. The beater 319 directs the crop upwardly through an inlet transition section 322 to a rotary cleaning and separating assembly 324. In other implementations, other orientations and types of cleaning structures and other types of headers 316, such as transverse frame supporting individual row units, are utilized.

The rotary cleaning and separating assembly 324 threshes and separates the harvested crop material. Grain and chaff fall through a concave 325 and separation grates 323 on the bottom of the assembly 324 to a cleaning system 326, and are cleaned by a chaffer 327, sieve 328 and air fan 329. The cleaning system 326 removes the chaff and directs the clean grain to elevator 333. Clean grain elevator 333 conveys the grain to tank 342. The clean grain in the tank 342 can be unloaded into a grain cart or truck by unloading auger. Tailings fall into the return elevator or auger 331 and are conveyed to the rotor 337 wear they are threshed a second time.

Threshed and separated straw is discharged from the rotary cleaning and separating assembly 324 through an outlet 332 to a discharge beater 334. The discharge beater 334, in turn, propels the straw out the rear of the combine. It should be noted that the discharge beater 334 could also discharge crop material other than grain directly to a straw chopper. The operation of the combine is controlled from an operator's cab 335.

Figure 11:
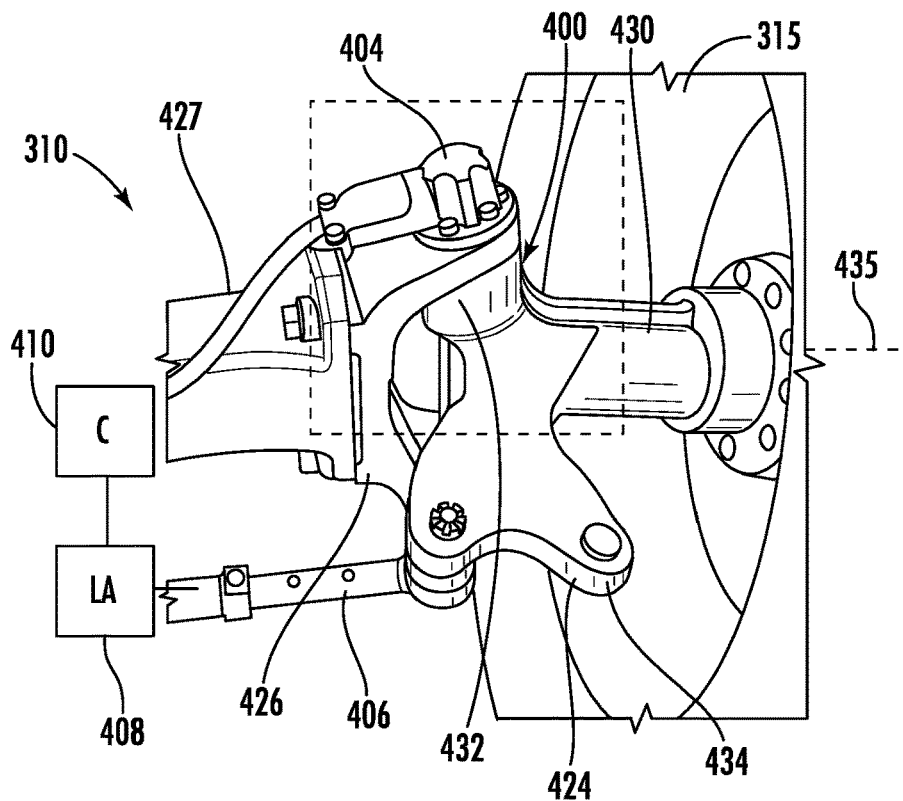
FIG. 11 is an enlarged fragmentary perspective view of the example rotary positioning system of FIG. 10.

FIGS. 11-14 illustrate rotary positioning system 310 in more detail. Rotary positioning system 310 is utilized in combine harvester 300 to steer combine harvester 300. As shown by FIG. 11, for each of rear wheels 315, rotary positioning system 310 comprises steering spindle 400, rotary position sensing system 404, steering linkage 406 and linear actuator 408 (schematically shown). Rotary positioning system 310 further comprises a steering controller 410 which controls the linear actuator 408 associated each of the rear wheels 315. Steering controller 410 may comprise electronics, such as a processing unit and associated logic or non-transitory computer-readable medium or memory that output control signals to each of the linear actuators 408 in response to commands or inputs entered by an operator in cab 335 using a steering wheel or other steering interface or by commands or inputs from a remote controlling system.

Figure 12:
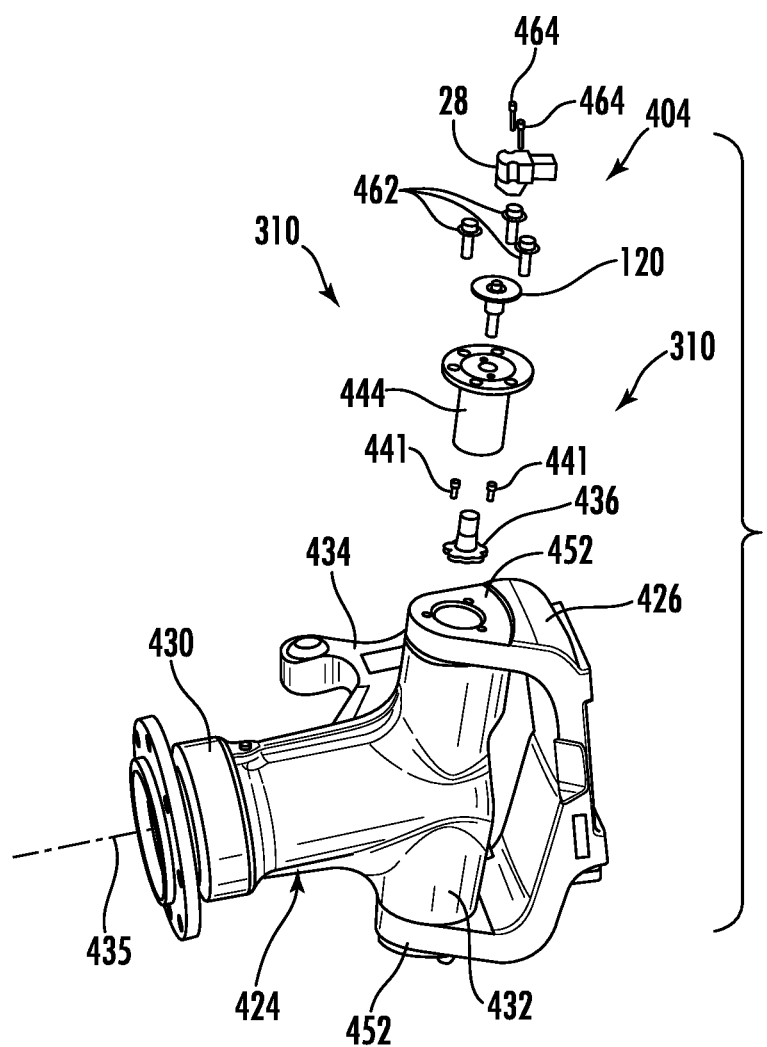
FIG. 12 is an exploded perspective view of portions of the example rotary positioning system of FIG. 11.

Steering spindle 400 comprises a linkage supporting its respective rear wheel 315 for rotation to reorient the respective rear wheel 315 for steering combine harvester 300. Steering spindle 400 comprises a first member 424 and a second member 426. First member 424 is pivotally connected to second member 426 for rotation about axis 428 (shown in FIG. 13). First member 424 comprises wheel mount 430, central pivot portion 432, extension 434 (each of which is shown in FIGS. 11 and 12) and sensor coupling shaft 436 (shown in FIG. 13).

Figure 13:
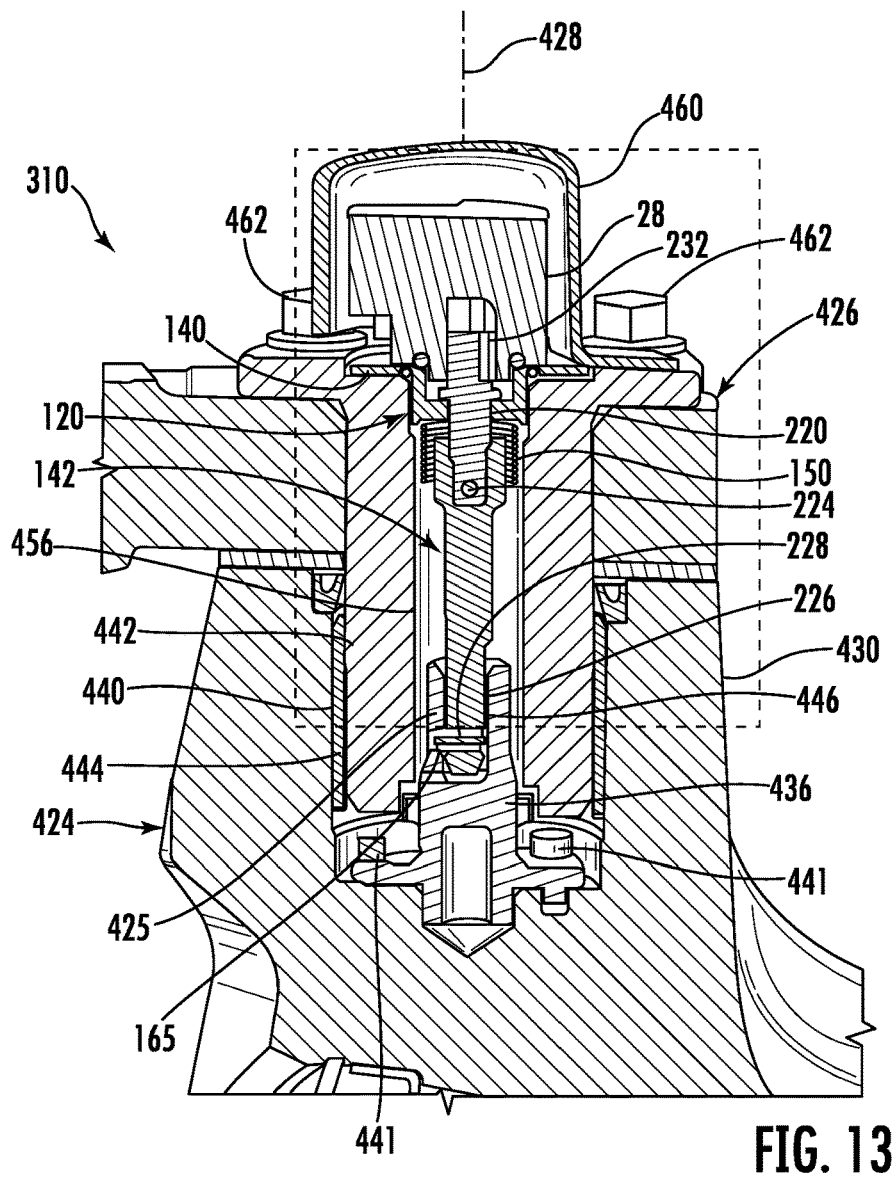
FIG. 13 is a sectional view of portions of the rotary positioning system of FIG. 11.

Wheel mount 430 is coupled to wheel 315 to rotatably support wheel 315 about its rotational axis 435. Central pivot portion 432 extends from wheel mount 430, generally perpendicular to axis 435. Central pivot portion 432 extends along axis 428 to rotate about axis 428. As shown by FIG. 13, central pivot portion 432 comprises a bore 440 along axis 428 receives a cylinder 442 of second member 426. Bore 440 facilitates rotation of cylinder 442 and second member 426 about axis 428 with bearings 444 (or a friction reducing medium, disposed between cylinder 442 and interior surfaces of bore 440.

Extension 434 extends from wheel mount 430 and/or central pivot portion 432, eccentric to axis 428. Extension 434 is configured to be connected to steering linkage 406 as shown in FIG. 11. Linear actuator 408 (schematically shown in FIG. 11) extends or retracts steering linkage 406 to exert a torque upon first member 424, rotating first member 424 about axis 4 and 28. In one implementation come linear actuator 408 may comprise a hydraulic cylinder-piston assembly operable under the control of controller 410. In other implementations, linear actuator 408 may comprise other mechanisms for driving steering linkage 406.

Figure 14:
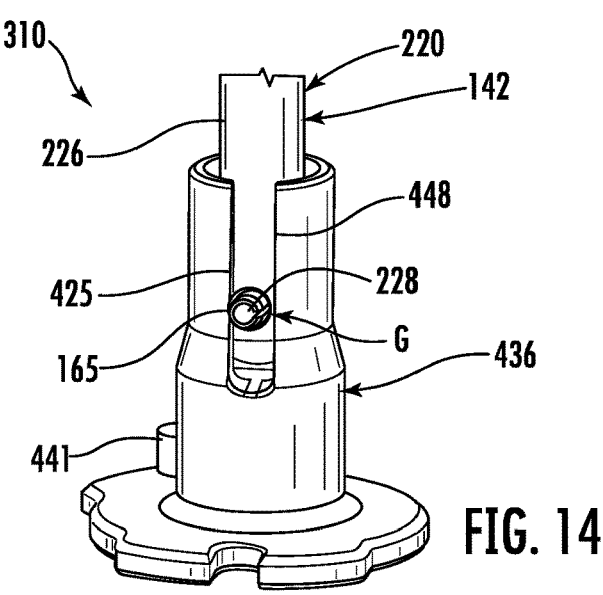
FIG. 14 is an enlarged fragmentary perspective view of portions of the example rotary positioning system of FIG. 11.

Sensor coupling shaft 436 facilitates the sensing of the rotation and/or positioning of first member 424 about axis 428 and relative to second member 426. Sensor coupling shaft 436 extends within bore 440 and partially into cylinder 442. In the example illustrated, sensor coupling shaft 436 is fixed against rotation with respect to axis 428 and is secured to central pivot portion 432 by fasteners 441. Sensor coupling shaft 436 itself comprises an internal bore 446 that receives lower portion 226 of isolator 120. As shown by FIGS. 13 and 14, sensor coupling shaft 436 comprises an elongate slot providing a torque coupling surface 425 against which torque coupling surface 165 of pin 228 of isolator 220 is resiliently biased against by spring 150.

Second member 426 is fixedly coupled to an axle 427 of the combine harvester 300 and pivotably supports first member 424 for rotation about axis 428. Second member 426 comprises a clevis having first and second spaced ends 452 between which central pivot portion 432 of first member 424 is sandwiched. As shown by FIG. 13, second member 426 further comprises cylinder 442 which is mounted to one of ends 452 and extends into bore 444 of central pivot portion 4324 rotation within bore 444. Cylinder 442 comprises an internal bore 456 which receives an upper portion of sensor coupling shaft 436 and through which linkage 142 of isolator 120 extends.

Rotary position sensing system 404 senses the rotation and/or angular positioning of first member 424 relative to second member 426 about axis 428. Signals from rotary position sensing system 404 are transmitted to controller 410, providing closed-loop feedback control over the extension and retraction linear actuator 408 to control the angular positioning of the respective wheel 315 out axis 428. Rotary position sensing system 404 comprises rotary position sensor 22 and isolator 120 each of which are described above. The positioning of rotary position sensor 22 along axis 428, the axis about which first member 424 is pivoted or rotated with respect to second member 426, facilitates more compact arrangement of sensing components for sensing the rotation or angular positioning of the first member 424. As shown by FIG. 13, in the example illustrated, sensor 22 is housed or enclosed in a cover 460 which is fastened to cylinder 442 by fasteners 462.

Isolator 120 extends from sensor 22, through bore 456 and into engagement with sensor coupling shaft 436. Mount 140 of isolator 120 is fixed against rotation with respect axis 428 by fasteners 464 which pass through mounting bosses 465 (shown in FIG. 15C) of sensor 22 and through apertures 466 of mount 140 (shown in FIGS. 6 and 9) into cylinder 442 of second member 426. As best shown by FIG. 14, pin 228 is positioned within slot 448, with pin 228 projecting through slot 448 outside of shaft 436. Spring 150 resiliently biases torque coupling surface 165 of pin 228 against torque coupling surface 425 of shaft 436, the internal edge of slot 448.

Figure 15A:
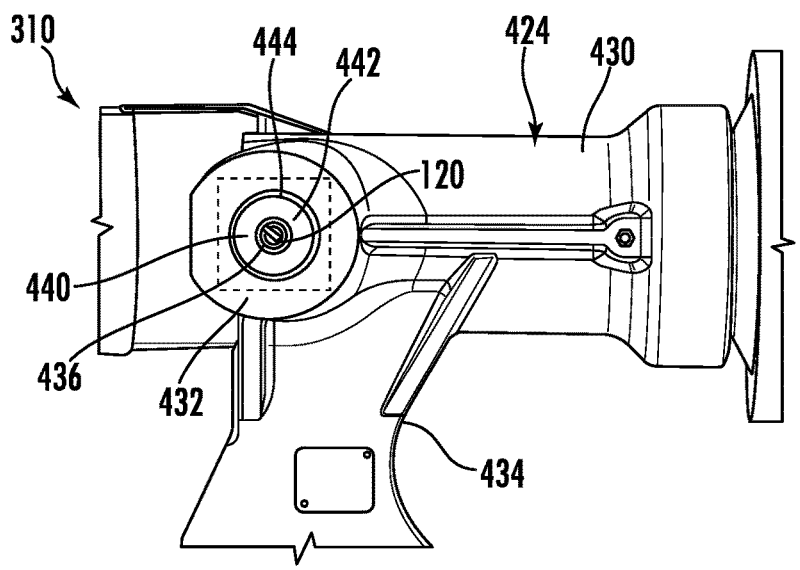
FIG. 15A is a bottom view of portions of the example rotary positioning system of FIG. 11 in a straight ahead position.
Figure 15B:
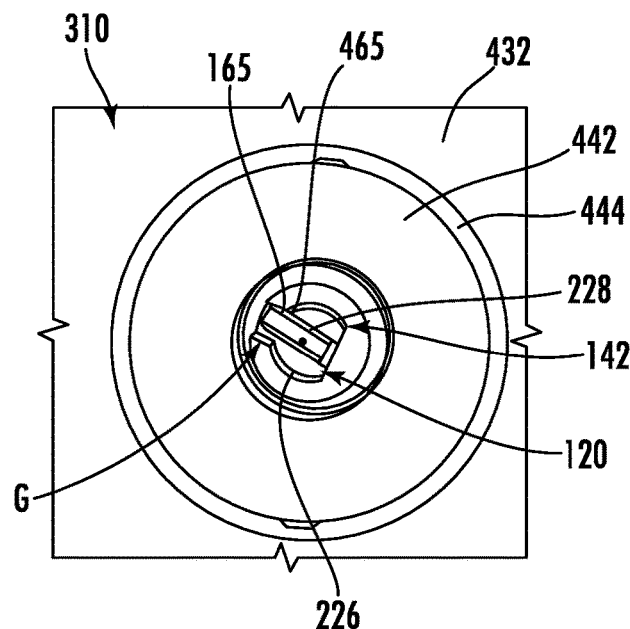
FIG. 15B is a sectional view of the example rotary positioning system of FIG. 15A.
Figure 15C:
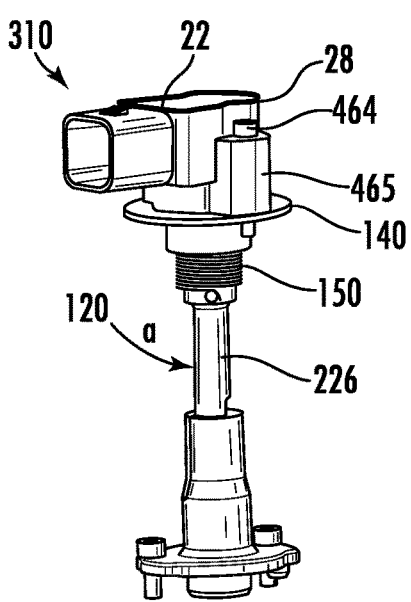
FIG. 15C is a perspective view of portions of the example rotary positioning system of FIG. 15A.
Figure 16A:
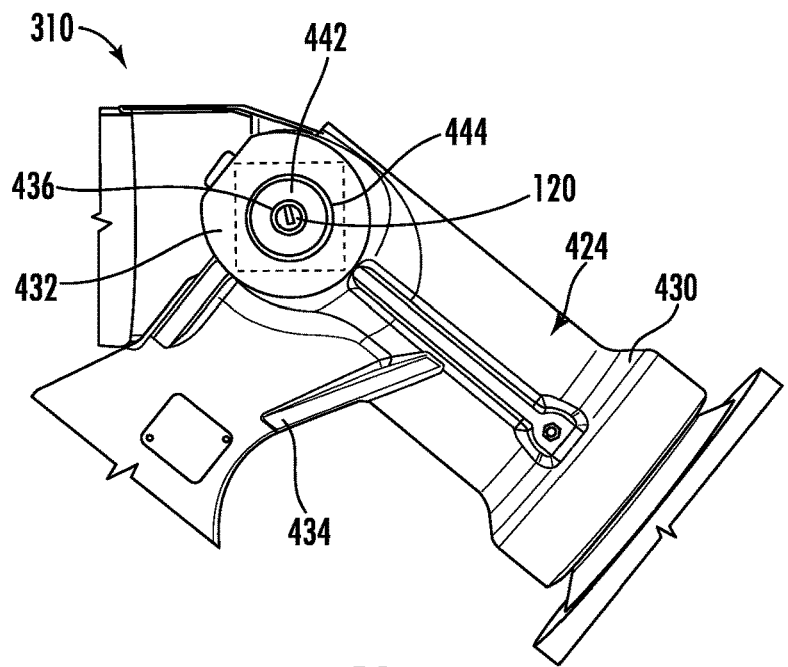
FIG. 16A is a bottom view of portions of the example rotary positioning system of FIG. 11 in a left-hand turning position.
Figure 16B:
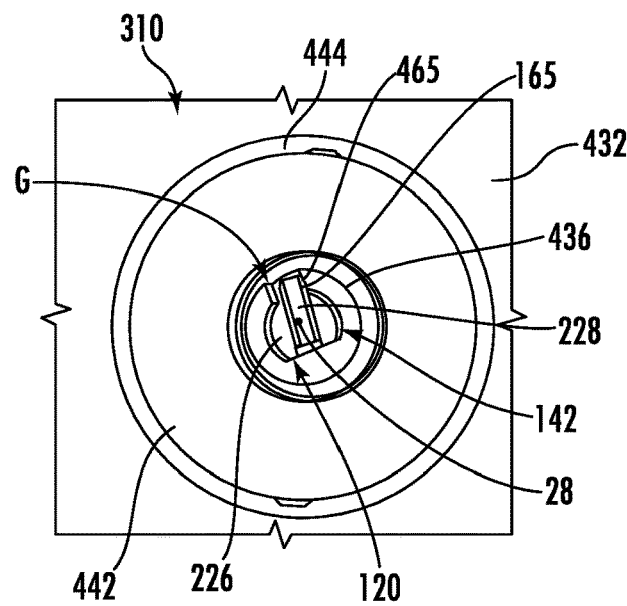
FIG. 16B is a sectional view of the example rotary positioning system of FIG. 16A.
Figure 16C:
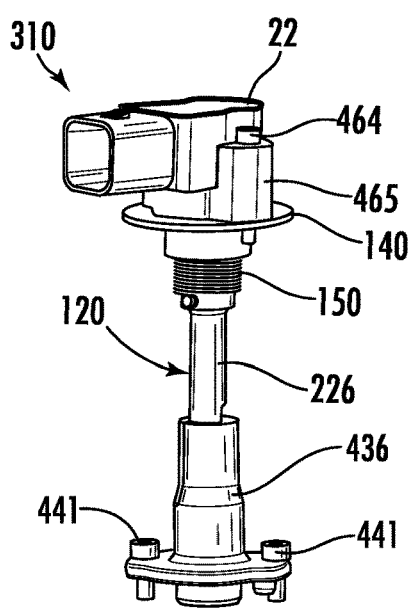
FIG. 16C is a perspective view of portions of the example rotary positioning system of FIG. 16A.

FIGS. 15A, 15B and 15C illustrate rotary positioning system 310 in a straight ahead position. FIGS. 16A, 16B and 16C illustrate rotary positioning system 310 in a left-hand turn position (approximately 40 to 45 degrees). As shown by such figures, spring 150 resiliently biases torque coupling surface 165 provided by pin 228 against the torque coupling surface 465 provided by shaft 436 regardless of the angular positioning of the first member 424 about axis 464. As a result, spring 150 removes hysteresis. In other words, the initiation of rotation of first member 424 about axis 428 immediately, and without delay, causes corresponding rotation of linkage 142. Torque is immediately transmitted from surface 425 to surface 165 upon rotation of first member 424 by linear actuator 408.

Rotation of linkage 142 further results in torque being transmitted to torque receiving component 30 of sensor 22 (shown in FIG. 1) to move torque receiving component 30. The at least one sensing element 32 (also shown in FIG. 1) senses such motion and outputs signals indicating the rotation and/or positioning of linkage 142 and first member 424. Such signals are transmitted to controller 410. Controller 410 may utilize such signals to adjust the positioning of first member 424 by outputting further control signals to linear actuator 408.

Because removal of the hysteresis by torsion spring 150 is independent of torque receiving component 30 and rotary position sensor 22 so as to reduce wear and potential damage to rotary position sensor 22. This results in a more robust rotary position sensing system that provides reliable and accurate sensing with respect to the angular positioning of first member 424 and/or its rotation.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An isolator for a rotary sensor that senses rotation of a first member about an axis relative to a second member by sensing movement of a torque receiving component of the rotary sensor, the first member having a first torque coupling surface, the isolator comprising:
    a mount fixed against rotation about the axis;
    a linkage to be coupled to the torque receiving component of the rotary sensor, the linkage having a second torque coupling surface separable from the first torque coupling surface by a play gap, wherein during rotation of the first member about the axis, the first torque coupling surface is to contact the second torque coupling surface to transmit torque to the linkage;
    a torsion spring captured between the mount and the linkage independent of the torque receiving component to resiliently bias the second torque coupling surface about the axis through the play gap and into torque transmitting engagement with the first torque coupling surface.

2. The isolator of claim 1, wherein the torsion spring is pre-wound and compressed independent of the torque receiving component of the rotary sensor.

3. The isolator of claim 1, wherein the torsion spring encircles the axis.

4. The isolator of claim 1, wherein the linkage passes through the mount, from a first side of the mount to a second side of the mount, into engagement with the torque receiving component.

5. The isolator of claim 1, wherein the first member comprises a slot having an edge forming the first torque coupling surface and wherein the linkage comprises a pin to be received within the slot and to provide the second torque coupling surface.

6. The isolator of claim 1, wherein the mount comprises a first catch and wherein the linkage comprises a second catch, wherein the torsion spring is pre-wound, the torsion spring having a first end engaging the first catch in a second end engaging the second catch.

7. The isolator of claim 6, wherein the second catch comprise a pin.

8. The isolator of claim 7, the linkage comprises a first portion removably mounted to a second portion, the second portion to engage the torque receiving component of the sensor, wherein the pin connects the first portion to the second portion.

9. A rotary positioning system comprising:
    a first member having a torque coupling surface;
    a second member, wherein the first member is rotatable relative to the second member about an axis in response to torque transmitted across a torque coupling surface;
    a rotary position sensor comprising:
        a torque receiving component; and
        at least one sensing element to sense movement of the torque receiving component; and
    an isolator comprising:
        a mount fixed against rotation about the axis;
        a linkage to be coupled to the torque receiving component of the rotary sensor, the linkage having a second torque coupling surface separable from the first torque coupling surface by a play gap, wherein during rotation of the first member about the axis, the first torque coupling surface is to contact the second torque coupling surface to transmit torque to the linkage;
        a torsion spring is captured between the mount and the linkage independent of the torque receiving component to resiliently bias the second torque coupling surface about the axis through the play gap and into torque transmitting engagement with the first torque coupling surface.

10. The rotary positioning system of claim 9, wherein the torsion spring is pre-wound and compressed independent of the torque receiving component of the rotary sensor.

11. The rotary positioning system of claim 9, wherein the torsion spring encircles the axis.

12. The rotary positioning system of claim 9, wherein the linkage passes through the mount, from a first side of the mount to a second side of the mount, into engagement with the torque receiving component.

13. The rotary positioning system of claim 9, wherein the first member comprises a slot having an edge forming the first torque coupling surface and wherein the linkage comprises a pin to be received within the slot and to provide the second torque coupling surface.

14. The rotary positioning system of claim 9, wherein the mount comprises a first catch and wherein the linkage comprises a second catch, wherein the torson spring is pre-wound, the torsion spring having a first end engaging the first catch in a second end engaging the second catch.

15. The rotary positioning system of claim 14, wherein the second catch comprise a pin.

16. The rotary positioning system of claim 15, the linkage comprises a first portion removably mounted to a second portion, the second portion to engage the torque receiving component of the sensor, wherein the pin connects the first portion to the second portion.

17. The rotary positioning system of claim 9 further comprising a combine harvester steering spindle, the combine harvester steering spindle comprising the first member and the second member.

18. The rotary positioning system of claim 17, wherein the second member comprises a clevis to be fixed to an axle of a combine harvester and wherein this first member is rotatable between ends of the clevis.

19. The rotary positioning system of claim 18, wherein the second member comprises a cylinder through which the linkage extends and wherein the first member comprises a bore along the axis receiving the cylinder and a shaft rotatably received within the cylinder, the shaft comprising the first torque coupling surface and receiving the linkage.

20. A rotary position sensing method comprising:
rotating a first member relative to a second member;
transmitting torque from the rotating first member to a linkage through interaction of a first torque coupling surface of the first rotating member to a second torque coupling surface of the linkage, wherein the first torque coupling surface and the second torque coupling surface are separable by a play gap;
transmitting torque of the linkage to a torque receiving component of a rotary sensor;
sensing movement of the torque receiving component to indicate rotation of the first member relative to the second member; and
resiliently biasing the second torque coupling surface of the linkage about the axis against the first torque coupling surface with a torsion spring independent of the torque receiving component of the rotary sensor.

* * * * *